Feb. 27, 1962 C. TREE 3,022,608
TAPER GRINDING TOOL
Filed Jan. 11, 1960 3 Sheets-Sheet 1

INVENTOR
CHARLES TREE

BY *Wright & Wright*

ATTORNEYS

Feb. 27, 1962 C. TREE 3,022,608
TAPER GRINDING TOOL
Filed Jan. 11, 1960 3 Sheets-Sheet 2
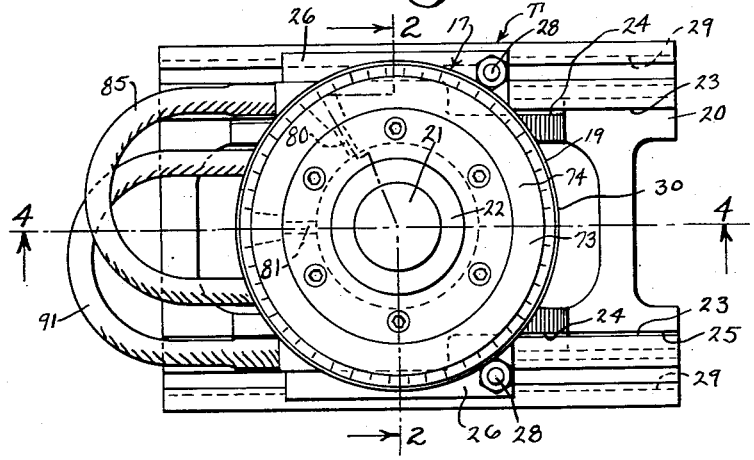
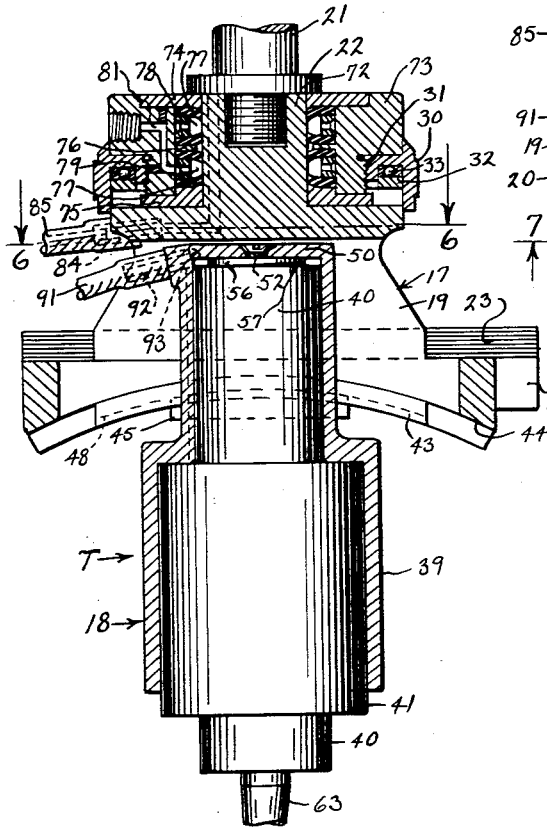
INVENTOR
CHARLES TREE
BY Wright Wright
ATTORNEYS Feb. 27, 1962     C. TREE     3,022,608
TAPER GRINDING TOOL
Filed Jan. 11, 1960     3 Sheets-Sheet 3
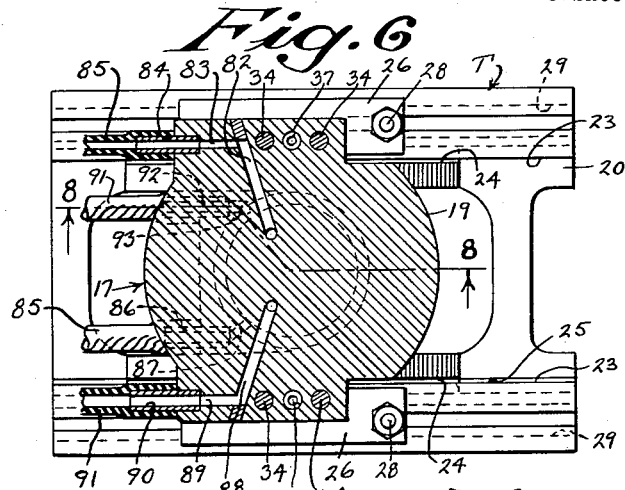
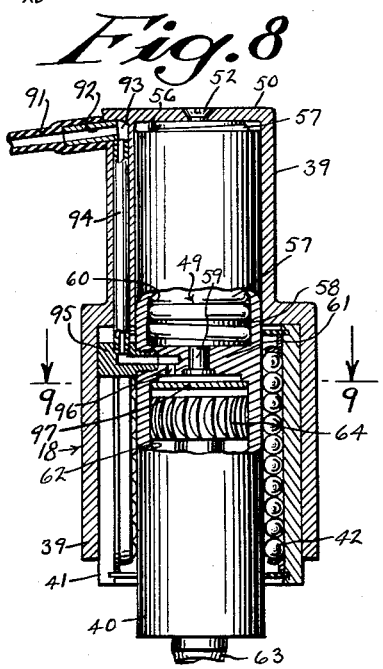
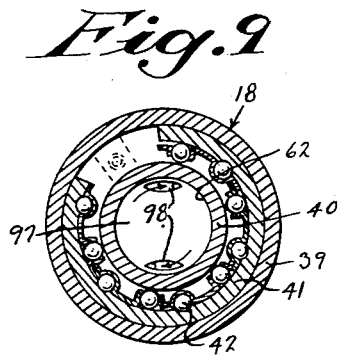
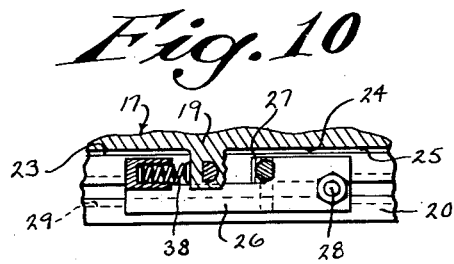
INVENTOR
CHARLES TREE
BY *Wright and Wright*
ATTORNEYS

United States Patent Office 3,022,608
Patented Feb. 27, 1962

3,022,608
TAPER GRINDING TOOL
Charles Tree, Racine, Wis., assignor to Tree Tool & Die Works, Racine, Wis., a firm
Filed Jan. 11, 1960, Ser. No. 1,544
9 Claims. (Cl. 51—43)

This invention appertains to a taper grinding tool and more particularly to a removable grinding head for association with any preferred type of machine tool, such as a "Tree" vertical milling machine, see my Patent No. 2,664,789 issued January 5, 1954.

One of the primary objects of my present invention is to provide a precision grinding tool having a shank for detachable connection with the chuck of a milling or like machine, whereby such machine can be successfully used for internal and other grinding of tools, dies, fixtures and the like, without the necessity of employing a separate, expensive jig grinder.

Another salient object of my invention is to provide a versatile precision grinding tool having both a fine radial adjustment and an angular adjustment, whereby the grinding wheel can be accurately positioned for various types of close tolerance grinding in the making of dies, fixtures and the like.

A further object of my invention is the provision of novel means for reciprocating the spindle and its grinding tool by oil pressure and novel means for rotating the spindle at an exact desired speed by an air turbine.

Another further object of my invention is the provision of novel means for incorporating the air turbine and the oil pressure feed with the grinding head and body, whereby the same will be effectively sealed and whereby radial and angular adjustment of the spindle can be accomplished without affecting the sealing and the feeding of oil and air pressure to the body.

A still further object of my invention is the provision of a novel spring suspension and return for the quill carrying the spindle for facilitating the proper operation of the quill and spindle during the reciprocation thereof.

Another still further object of the invention is the provision of a novel mounting for the quill in the head and body whereby to insure the smooth sliding of the quill with the spindle during the up and down strokes.

A still further important object of my invention is to provide a novel and simple means for bringing about the radial adjustment of the grinder body with the quill and its spindle embodying a graduated micrometer feed dial engaging a thrust ring, which in turn actuates spring returned feed pins located on opposite sides of the head having inclined or cam actuating faces for operative engagement with selected inclined faces of initially positioned blocks carried by the grinder body slidably mounted on the grinder head.

A still further important object of my invention is to provide a taper grinding tool of the above character, which will be durable and efficient in use, one that will be of a compact and simple nature, and one which can be placed upon the market at a reasonable price.

With these and other objects in view, the invention consists in the novel construction, arrangement and formation of parts, as will be hereinafter described and claimed, and illustrated in the accompanying drawings, in which drawings, FIGURE 1 is a side elevational view of my improved taper grinding tool showing the same connected with the chuck of a milling machine or the like, the view illustrating the tool in use, parts of the figure being shown broken away and in section to illustrate structural detail;

FIGURE 3 is a top plan view of my improved taper grinding tool;

FIGURE 4 is a longitudinal sectional view taken at right angles to FIGURE 2 and on the line 4—4 of FIGURE 3, looking in the direction of the arrows, the quill and its sleeve being shown in elevation;

FIGURE 5 is a horizontal sectional view through the head or upper section of the taper grinding tool, the section being taken on the line 5—5 of FIGURE 1, looking in the direction of the arrows, the view showing the inlet ports for the oil and air under pressure;

FIGURE 6 is a horizontal sectional view taken on the line 6—6 of FIGURE 4 looking in the direction of the arrows, the view showing the outlets for the air and oil under pressure from the head or upper section of the tool, the outlets in turn, leading to the body or lower section of the tool;

FIGURE 7 is a fragmentary detail vertical sectional view taken on the line 7—7 of FIG. 5 looking in the direction of the arrows, the view showing the port for the oil leading to the body or lower section of the grinder for bringing about reciprocation of the quill and its spindle;

FIGURE 8 is a longitudinal sectional view through the body or lower section of the tool, the view being taken on the line 8—8 of FIG. 6, looking in the direction of the arrows, the view illustrating the feeding of air under pressure to the turbine;

Figure 1:
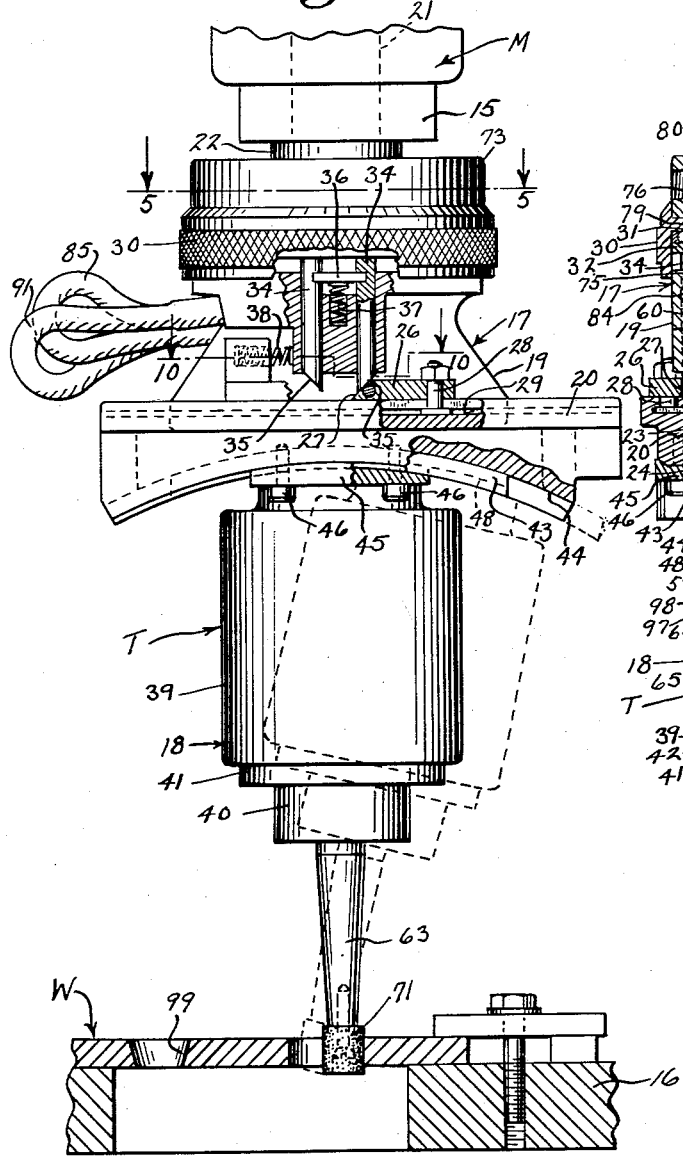

FIGURE 9 is a horizontal sectional view taken on the line 9—9 of FIGURE 8, looking in the direction of the arrows and illustrating the position and shape of the ports for air under pressure leading to the turbine, and FIGURE 10 is a fragmentary detail horizontal sectional view taken on the line 10—10 of FIGURE 1, looking in the direction of the arrows and illustrating one of the adjustable blocks for bringing about radial adjustment of the body or lower section of the tool relative to the head or upper section of the tool.

Referring to the drawings in detail, wherein similar reference characters designate corresponding parts throughout the several views, the letter T generally indicates my novel taper grinding tool for association with any desired type of milling or like machine M. The milling machine M as stated above, can be of any desired character and hence the same is not shown in detail, but the same includes a tool receiving chuck 15 and a table 16 for the work W being operated upon.

The taper grinding tool T includes a head 17 and a grinder body 18. The grinder body 18 is carried by the head 17 for angular adjustment and the head itself is built in an upper section 19 and a lower section 20 for bringing about the radial adjustment of the body 18, as will be later set forth.

The upper head section 19 at its axial center carries a shank 21 for connection with the chuck 15. The shank 21 can be threaded into the head section 19 and the shank can carry an annular flange 22 for binding contact with the upper face of the head and this flange 22 can be utilized as an additional means for rotatably holding certain parts in place.

Now referring to the radial adjustment of the grinder body 18, it can be seen that the lower end of the grinder head section 19 is provided with horizontally disposed beveled guide ribs 23. The upper face of the lower section 20 of the head is provided with complementary keyways 24. The section 20 is slid on the ribs 23 from one end of the head and is mounted for a free movement across the tool. Thus there is a dovetailed slide connection between the sections 19 and 20. A wear gib 25 can be provided. On each side of the section 20 are adjustable actuator blocks 26. Each block intermediate its ends is provided with an active beveled or cam face 27, the purpose of which will later appear. The blocks 26 are held in their selected adjusted positions by means of bolts 28 and the bolts have their heads slidably mounted in keyways 29 formed in the section 20. By tightening the bolts, the blocks can be held in their desired position. It is to be also noted that the blocks 26 are freely removable for a purpose which will also later appear. Mounted on the head section 19 is a serrated dial feed ring 30 and the ring is mounted on the head section 19 through the medium of fine threads 31. By rotating the dial feed ring 30, the same can be minutely fed up or down an exact desired distance and the ring and head can be graduated to indicate the exact amount of movement. Disposed within the head section 19 is a thrust ring 32 movable downward by the dial ring. In order to lessen friction between the dial ring 30 and thrust ring 32, anti-friction bearings 33 can be provided between the dial ring and thrust ring. Slidably mounted on opposite sides of the head are thrust pins 34 and these thrust pins are provided with inclined or cam faces 35 for selective engagement with the inclined faces 27 of the actuator blocks 26. The thrust pins 34 on each side of the head are inter-connected for simultaneous movement by a connector strap 36 and each strap has bearing against the same an expansion spring 37 carried in a pocket formed in the head. Thus, the spring 37 tend to normally move the thrust pins 34 up and in constant engagement with the thrust ring 32.

From the description so far, it can be seen that upon turning of the dial ring 30 in one direction that the thrust pins 34 will be moved downwardly and one thrust pin of each pair of thrust pins will engage its actuator block 26. As the inclined faces 35 of the active pins 34 engage and push down against the inclined faces 27 of the blocks 26, the blocks 26 and consequently the head section 20 will be slid to the right (see FIG. 1). This gives the desired radial adjustment of the grinder body radially across the body in one direction. An expansion spring 38 can be interposed between each block 26 and a portion of the head section 19 so as to insure the correct engagement of the inclined faces of the selected pins 34 with the inclined faces of the blocks 26.

After radial adjustment of the body 18 in one direction and when it is desired to return the body 18 into exact axial alignment with the shank 21, the dial ring can be rotated in a reverse upward direction and the head section 20 will be slid back by the springs 38 into engagement with the operative thrust pins.

When it is desired to bring about accurate radial adjustment in the opposite direction, then it is merely necessary to interchange the blocks 26 from one side of the head to the other and during the interchanging to reverse the position of the blocks. By moving the blocks 26 from one side of the head to the other and turning the blocks around, the inclined faces 27 of the blocks will then be in position to be engaged by the oppositely beveled ends 35 of the pins 34 at the left hand side of FIG. 1.

Now referring to the grinder body 18 more particularly, and the angular adjustment thereof on the head 17, it is to be noted that the grinder body 18 includes an outer stepped cylindrical shell 39 and this shell carries for reciprocatory movement a cylindrical quill 40. As the quill 40 is mounted within the shell 39 for free sliding movement, the shell has fitted in its lower end a quill sleeve 41 carrying anti-friction bearings 42. The shell intermediate its ends is provided with outwardly extending arcuate guide lips 43 and these lips slidably engage the arcuate lower guide faces 44 formed on the head section 20. The head section 20 carries clamp blocks 45 on the opposite sides for clamping engagement with the arcuate guide lips 43 and the blocks 45 are brought into and out of binding contact with the lips by machine screws 46 which extend through the clamp blocks and into the head section 20. As illustrated, the clamp blocks are provided with clamp ribs 47 which are slidably received in guide grooves 48 formed in the lips 43. Obviously, by loosening the screws 46 the clamp blocks will be loosened and the grinder body 18 with the quill 40 can be slid to any angular position on the head 17 and clamp in such position by the tightening of the screws 46. Graduations can be provided for facilitating the accurate setting of the body.

Figure 2:
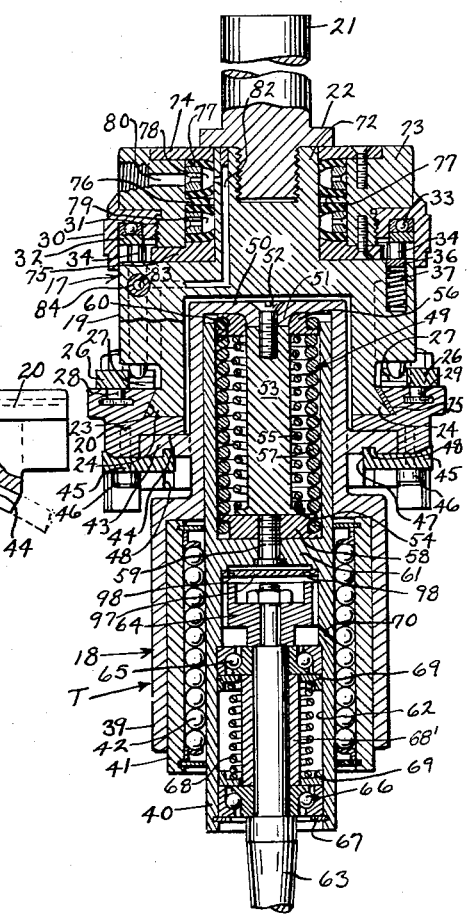
FIGURE 2 is a longitudinal sectional view through the taper grinding tool, the section being taken on the line 2—2 of FIGURE 3, looking in the direction of the arrows.

The quill 40 is held within the body shell 39 by a novel spring suspension 49. At this time, it is to be noted that the upper end of the body shell 39 is closed by a top wall 50 and that this top wall is provided with an axially disposed depending boss 51. Secured to the wall 50 and the boss 51, by a screw 52, is a depending guide post 53. The lower end of this post has formed thereon an annular flange 54 forming a seat for the lower convolution of an expansion spring 55 coiled around said post. The post 53 actually constitutes a continuation of the boss 51 and slidably mounted on the boss and post is an upper spring retainer ring 56. The upper convolution of the spring 55 bears against the upper retainer ring 56 and holds the same in an elevated position. The expansion spring is enclosed within a relatively heavy normally contracted coil spring 57 and this spring has its upper convolution threaded on the upper retaining ring 56. The lower convolution of the spring 57 is threaded on a lower retaining ring 58. The retainer ring 58 is firmly connected to the central portion of the quill 40 by means of a machine screw 59. Hence, the quill is suspended from the spring 57 which is in turn supported by the inner light spring 55. The lower retainer ring 58 is normally held in an abutting position against the lower end of the post 53 by the inner light spring 55. Now referring to the retainer rings 56 and 58, it is to be understood that the outer faces thereof are provided with spiral grooves so that the terminals of the outer heavy spring 57 can be turned or threaded on said rings. By referring more particularly to FIGURE 2, it can be seen that the upper end of the quill is provided with a pocket or chamber 60 in which the springs 55 and 57 are received, as well as the post 53. It is to be also noted that the quill is divided intermediate its ends by a partition wall 61, and it is this wall that divides the quill into the upper chamber or pocket 60 and the lower chamber or pocket 62. The upper chamber or pocket 60 constitutes an oil chamber as will later appear for operating the quill 40. The lower chamber 62 constitutes means for receiving a spindle 63 and as a housing or stator for a peripheral bladed turbine wheel or rotor 64, which is keyed or otherwise fastened to the extreme upper end of the spindle 63. The spindle 63 is mounted for free rotation within the quill 40 and upper and lower anti-friction bearings 65 and 66 are provided for this purpose. The lower bearing 66 is held in place by a split ring 67 associated with the lower end of the quill. The upper bearing is held firmly in place by the use of an expansion spring 68 and a spacer sleeve 68' is also employed for this purpose. The spring 68 functions more particularly to thrust up on the upper bearing and to hold sealing rings 69 against the upper and lower bearings, so that the turbine wheel or rotor 64 will be sealed within its stator or casing. At this time, it is to be noted that the quill below the turbine wheel is provided with an exhaust port 70.

The lower end of the spindle 63, of course, detachably carries the desired type of grinding wheel 71.

As heretofore brought out, the quill 40 is operated by oil pressures and the turbine wheel or rotor 64 is operated by air pressures. As also heretofore brought out, one of the important features of the invention is the provision of an effective means for bringing in the oil and air under pressure so that these pressures will be effectively sealed and so that the oil and air can be fed to the grinder body 18 and its quill without leakage. Thus, the head section 19 has formed thereon an axially disposed rigid post 72 and it is into this post that the shank 21 is threaded. Surrounding the post for turning movement and in spaced relation thereto is a solid collar 73 and it is this collar 73 that carries the feed dial 30. Securely clamped to the upper and lower faces of the solid collar are flat clamp plates 74 and 75, and these plates extend inwardly into sliding contact with the center post 72. Formed centrally on the inner face of the collar is an inwardly extending partition flange 76. With the collar and its adjuncts on the center post 72, upper and lower channels are provided and these channels receive respectively, upper and lower pairs of spaced sealing rings 77. The upper and lower spaced pairs of sealing rings 77 in conjunction with the upper and lower channels define upper and lower annular sealed ways 78 and 79. These rings 77 frictionally engage the post 72 but still permit the free turning of the post with its head relative to the collar 73. The upper annular way 78 constitutes an oil way and the lower way 79 constitutes an air way. Communicating with the upper way 78 is a radially extending inlet port 80. The outer end of this port 80 is internally threaded for the reception of a nipple (not shown), for an oil pressure line. The annular air way 79 has communicating therewith an inlet channel 81 and the outer end of this channel has its wall internally threaded for the reception of a nipple (not shown), for connection with an air line. At this time, attention is called to the fact that the flow of air is controlled by suitable valve means, forming no part of this invention, and that the valve means is such that the flow of air can be accurately controlled so that the speed of rotation of the turbine wheel or rotor 64 and the spindle 63 can be accurately controlled, and so that a great variety of rotary speeds can be obtained. The collar 73 and its adjuncts are held against displacement on the center post 72, and the upper end of the body section 19 by the flange 22 of the shank 21.

Communicating with the oil way 78 is an interior channel way 82, which in turn communicates with a substantially radially extending port 83. This port has connected therewith through a nipple 84 a short flexible tube or hose line 85 which leads from the head to a nipple 86 which in turn communicates with an inlet port 87 having communication with the extreme upper end of the grinder body housing shell 39. Thus, it can be seen that when oil is fed under pressure into the oil way 78 the same will be conducted by the flexible tube 85 to the upper end of the body shell 39. At this time, it is to be noted that the oil is forced into and sucked out of the quill by a pump actuated continuously back and forth from an air operated piston and cylinder and that the stroke of the piston is limited by adjustable stops. As this mechanism is standard, and forms no part of the grinder, the same has not been illustrated. However, it can be seen that when the tool is operating, the quill will be continuously moved up and down, so as to bring the grinder wheel 71 up and down against the wall of an opening or other work during the rotation of the spindle and the upward movement of the quill is aided by the spring suspension 49. It is to be noted also, that due to the flexible line 85, the grinder body can be radially adjusted and angularly adjusted without affecting the feed and return of oil into and from the body.

The air way 79 has communication through the medium of the interior channel 88 with an outlet head port 89. This port has communicating therewith through a nipple 90, a short flexible tube or hose line 91. This hose line in turn is connected with a nipple 92 carried by a body shell 39 and the nipple 92 communicates with a vertical way 93 formed directly in the body shell. Slidably mounted in the way 93 is an inlet tube 94 and this tube is rigidly carried by a nipple 95 threaded into the partition wall 61 of the quill 40. The nipple 95 in turn communicates with an inlet port 96 formed in the partition and this port opens out into the upper end of the chamber or stator 62. Fitted within the upper end of the chamber 62 and directly below the inlet port 96 is a turbine head plate 97 and this plate has formed therein diagonally extending feed ports 98. These feed ports 98 are so directed that the air entering the stator will be directed against the buckets or blades of the turbine wheel or rotor 64. Again, the spent air escapes through the exhaust port 70.

Thus it can be seen that the air under pressure is fed into the turbine by means of a flexible hose and thus the feed of air under pressure into the grinder body does not affect the radial and angular adjustment of this body.

From the foregoing description, it can be seen that I have provided an exceptionally simple and compact grinding tool which can be easily and quickly connected to any desired type of milling or like machine and that accurate means is provided for adjusting the grinding wheel to various angular positions and various radial positions relative to the axial center of the grinder.

The milling machine $m$ is actuated in the usual way to bring the grinding tool T and its grinding wheel 71 into the work W and the chuck 15 is rotated to turn the entire head. Thus, with the body 18 adjusted radially to a selected distance off center from the shank 21, the grinding wheel will be rotated around the wall of the opening being ground, during the high speed rotation of the spindle 63 with its grinding wheel 71.

With the body 18 adjusted angularly relative to the head and its shank 21 and with the rotation of the entire head, walls of an opening can be effectively ground with a taper as shown at 99 in FIGURE 1, and this is one of the important features of the invention.

Various changes in details may be made without departing from the spirit or the scope of this invention, but what I claim as new is:

1. A taper grinding tool comprising a head having an axially disposed shank for connection with the chuck of a machine tool, a grinder body disposed below said head including a shell, a quill slidably mounted in the shell, and a spindle rotatably carried by the quill, spring suspension means normally holding the quill in a raised position in the shell, and said quill including a hollow body having an intermediate partition wall defining an upper chamber in the quill and a lower chamber in the quill, the spring suspension being mounted in the upper chamber and the spindle being rotatably mounted in the lower chamber, means for adjusting the grinder body radially on said head relative to the shank, means for angularly adjusting the grinder body on the head, a turbine wheel secured to the spindle and disposed in the lower chamber of the quill, and said head being provided with independent spaced annular ways, one of said ways being for oil under pressure, and the other of said ways being for air under pressure, means for feeding and returning oil to and from its way, means for feeding air under pressure to its way, means including a flexible hose for connecting the way for oil with the interior of the shell and into and from the upper compartment of the quill for reciprocating the quill, the spring suspension aiding in the return stroke of the quill, and means including a flexible hose for feeding air under pressure from the way for air into the lower chamber of the quill and against the turbine wheel.

2. A taper grinding tool as defined in claim 1, and said spring suspension including an inner expansion spring, a center post in said quill and carried by the upper portion of the shell having a flange on its lower end forming a seat for the lowermost convolution of the expansion spring, an outer normally contracted coil spring housing the first spring and having its upper and lower ends anchored respectively to an upper spring retainer ring and a lower spring retainer ring, said upper retaining ring being slidable on the post and the upper end of the first spring normally urging the upper ring to a raised position, and said lower retaining ring being anchored to the partition wall of the quill.

3. A taper grinding tool as defined in claim 1, and said means for radially adjusting the grinder body on the head including a micrometer dial feed ring having threaded connection with the head, a thrust ring normally engaging the dial ring, thrust pins normally urged into engagement with the thrust ring having inclined lower ends, whereby upon turning of the dial ring the thrust pins will be moved downwardly, said head including an upper section and a lower section, said thrust pins, dial ring and thrust ring being carried by said upper section, said lower section being mounted for free sliding movement on the upper section and carrying said body, and adjustable blocks on said lower section, means holding the blocks in a selected adjusted position on said lower section, and said blocks and thrust pins having mating inclined faces whereby upon downward movement of the thrust pins the blocks and consequently the lower section will be slid on said upper section.

4. A taper grinding tool as defined in claim 3, and said blocks being also freely removable from the lower section and adapted to be interchanged and turned around from one side of the lower section to the other.

5. A taper grinding tool as defined in claim 1, and said head having a lower arcuate face, and said body having outwardly extending arcuate lips engaging said arcuate face, and adjustable clamp blocks carried by said head for clamping engagement with said lips for holding the body in a selected angular position, said arcuate faces, lips and clamp blocks constituting the means for bringing about the angular adjustment of said body.

6. A taper grinding tool as defined in claim 4, and said means for angularly adjusting the body on the head including arcuate lower faces on the lower head section, outwardly extending arcuate lips on the body engaging said faces, and adjustable clamp blocks being carried by said lower section for clamping engagement with said lips.

7. A grinding tool comprising a head having a shank for connection with a machine tool and a body carried by said head, said body including a quill, a rotary spindle and a grinding wheel on the spindle, means for adjusting the body on the head radially relative to the axial center of the shank, means for adjusting the body to a selected angular position on the head, means for reciprocating the quill with the spindle and grinding wheel relative to the work, and means for rotating the spindle in the quill, and said head having independent annular ways, one of said ways being adapted to receive oil under pressure and the other of said ways being adapted to receive air under pressure, means for supplying and returning oil to and from the oil way, means for supplying air under pressure to the air way, means including a flexible hose for connecting the oil way with the interior of the head and for feeding the oil against the upper end of said quill, and means including a flexible hose having communication with the air way and the interior of the quill, a turbine wheel secured to the spindle and means for directing the air against the said turbine wheel, said turbine wheel constituting the means for rotating the spindle by air pressure.

8. A grinding tool comprising a head having a shank for connecting with a machine tool and a body carried by said head, said body including a quill, a rotary spindle and a grinding wheel on the spindle, means for adjusting the body on the head radially relative to the axial center of the shank, means for adjusting the body to a selected angular position on the head, means for reciprocating the quill with the spindle and grinding wheel relative to the work, and means for rotating the spindle in the quill, and said head having independent annular ways, one of said ways being adapted to receive oil under pressure and the other of said ways being adapted to receive air under pressure, means for supplying and returning oil to and from the oil way, means for supplying air under pressure to the air way, means connecting the oil way with the interior of the head for feeding the oil against the upper end of said quill, and means connecting the air way with the interior of the quill, a turbine wheel secured to the spindle and means for directing the air against said turbine wheel, said turbine wheel constituting the means for rotating the spindle by air pressure.

9. A taper grinding tool comprising a head having an axially disposed shank for connection with the chuck of a machine tool, a grinder body disposed below said head including a shell, a quill slidably mounted in the shell and a spindle rotatably carried by the quill, said quill including a hollow body having an intermediate partition wall defining an upper chamber in the quill and a lower chamber in the quill, the spindle being rotatably mounted in the lower chamber, means for adjusting the grinder body radially on said head relative to the shank, means for angularly adjusting the grinder body on the head, means for rotating the spindle with the tool in said quill, and means for feeding and returning oil to and from the interior of the shell and into and from the upper compartment of the quill for reciprocating the quill in the shell.

References Cited in the file of this patent
UNITED STATES PATENTS

| | | |
|---|---|---|
| 2,559,180 | Victory | July 3, 1951 |
| 2,603,040 | Durkee | July 15, 1952 |
| 2,648,939 | Zelik | Aug. 18, 1953 |
| 2,784,538 | Clark | Mar. 12, 1957 |
| 2,846,903 | Pleger | Aug. 12, 1958 |
| 2,929,300 | Zwick | Mar. 22, 1960 |